Sept. 20, 1960 A. R. CUNNINGHAM 2,952,963
SIDE DELIVERY HAY RAKE
Filed Nov. 29, 1957 5 Sheets-Sheet 1
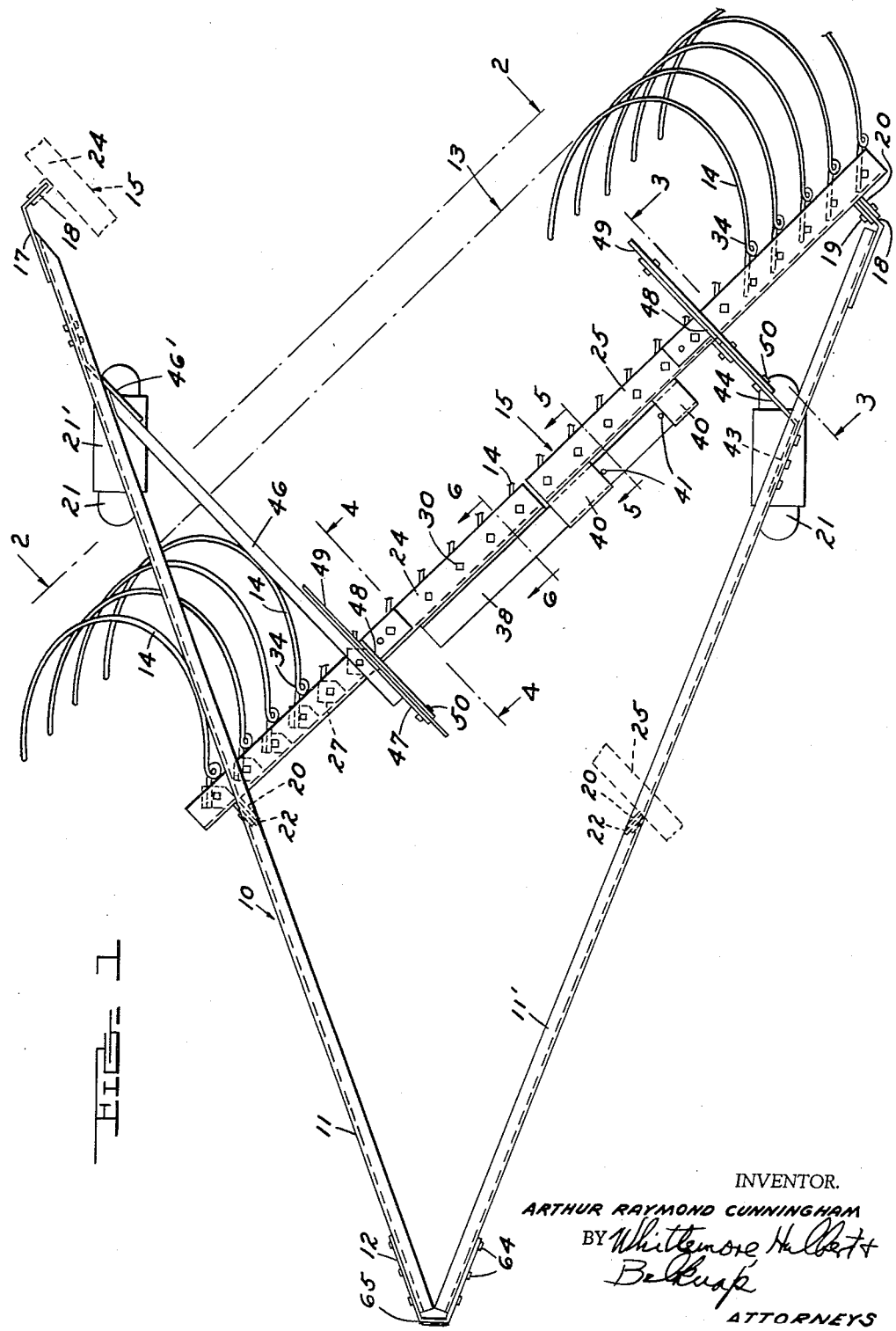
INVENTOR.
ARTHUR RAYMOND CUNNINGHAM
BY
ATTORNEYS

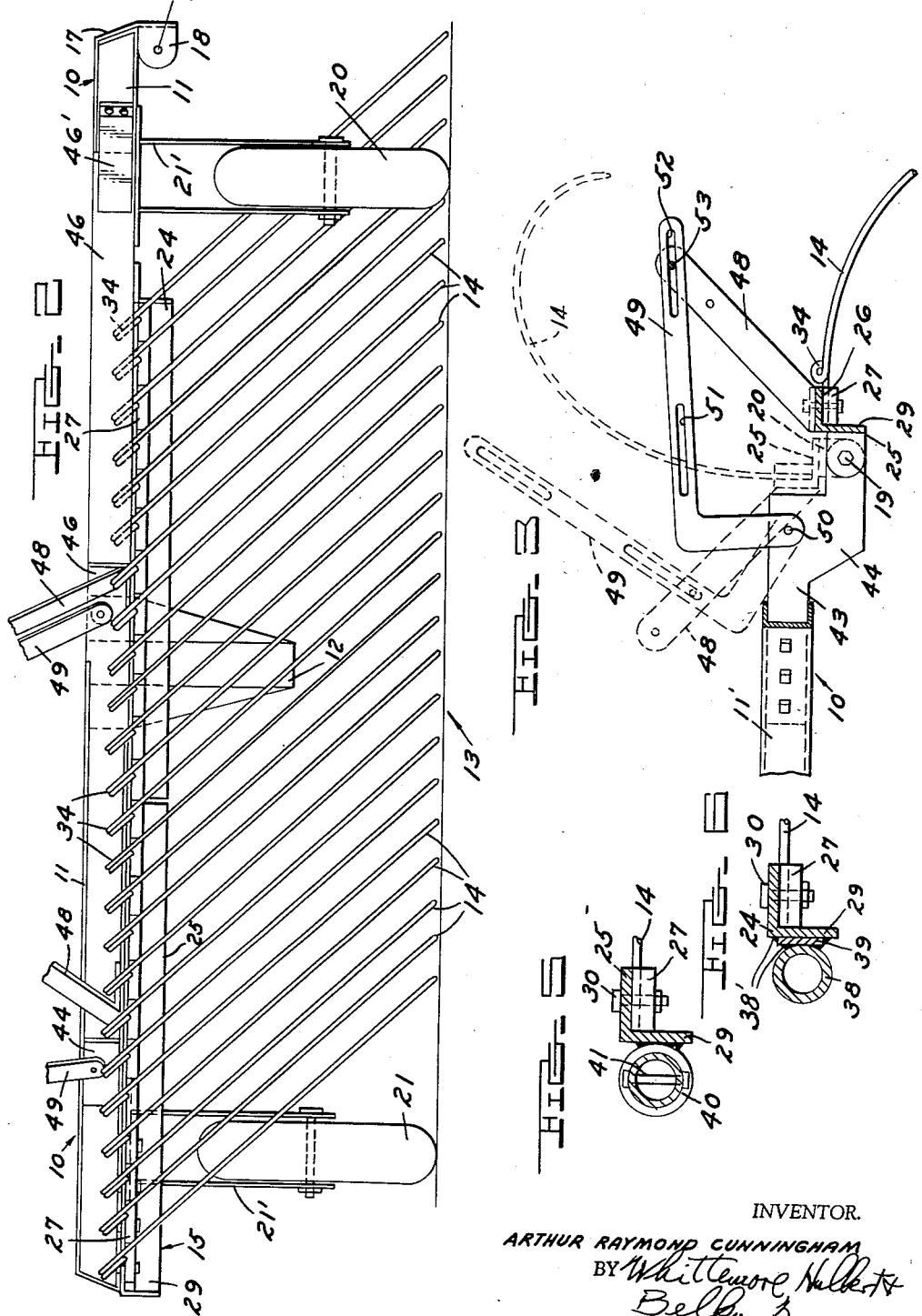

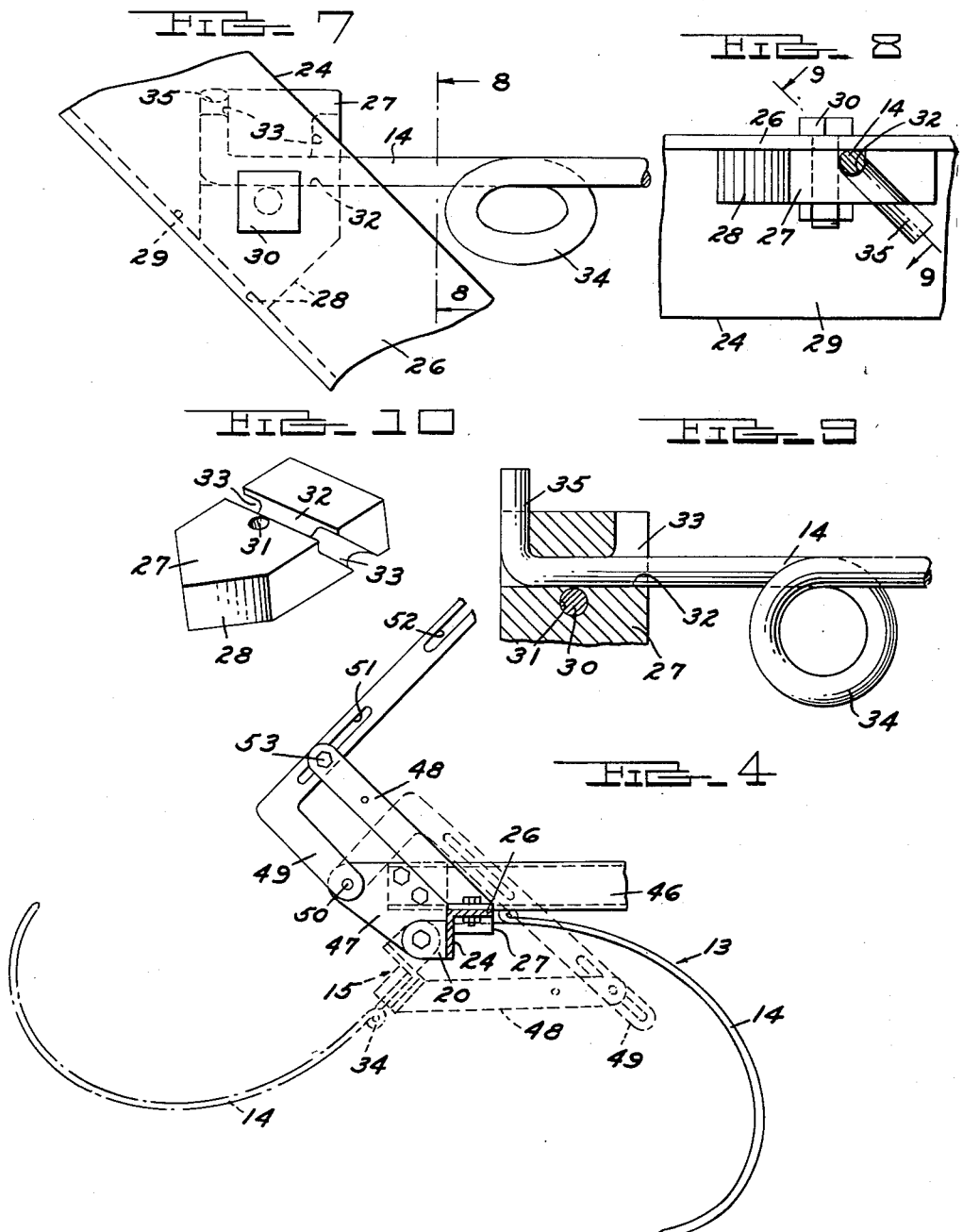

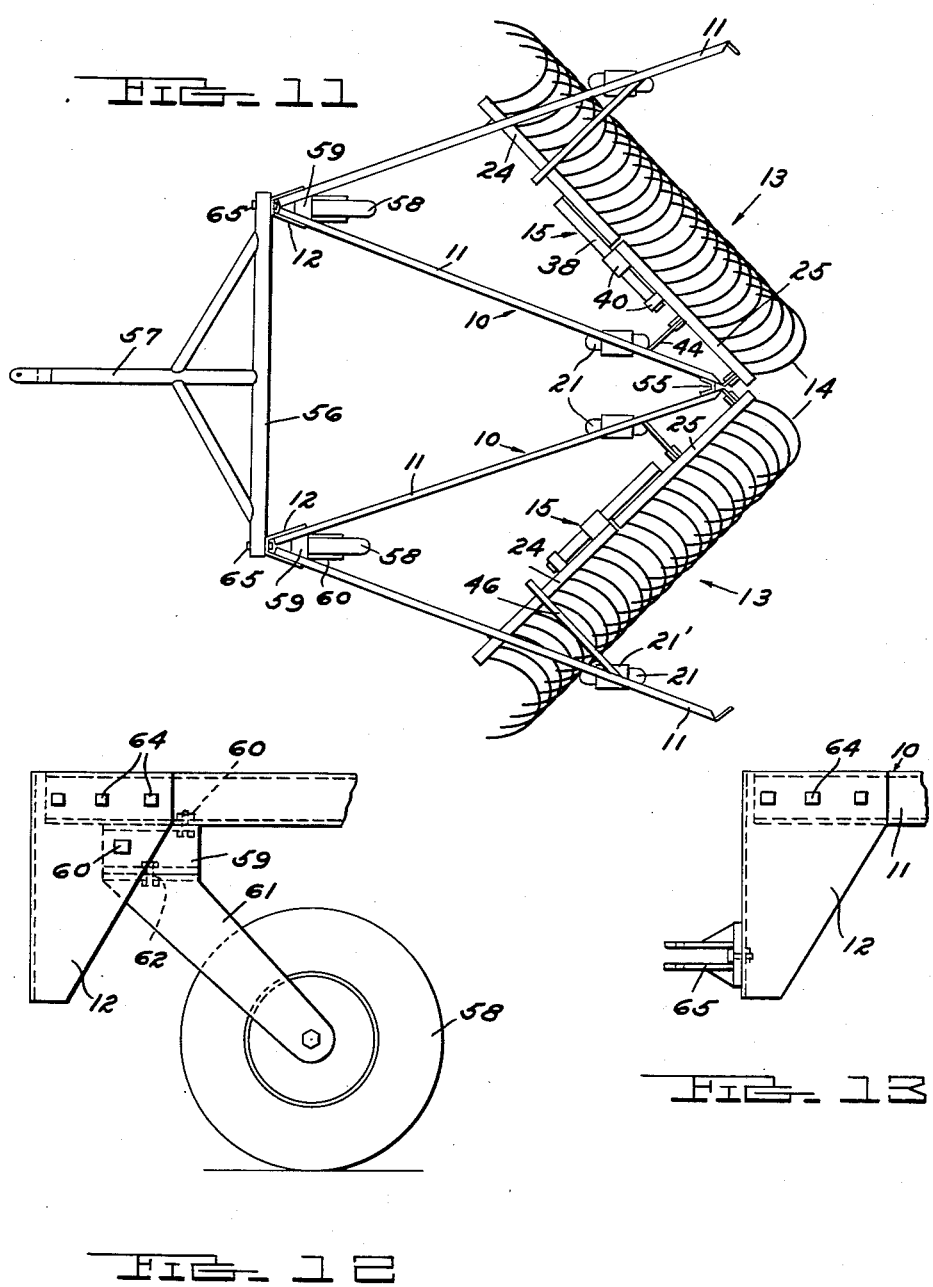

Sept. 20, 1960 A. R. CUNNINGHAM 2,952,963
SIDE DELIVERY HAY RAKE
Filed Nov. 29, 1957 5 Sheets-Sheet 5
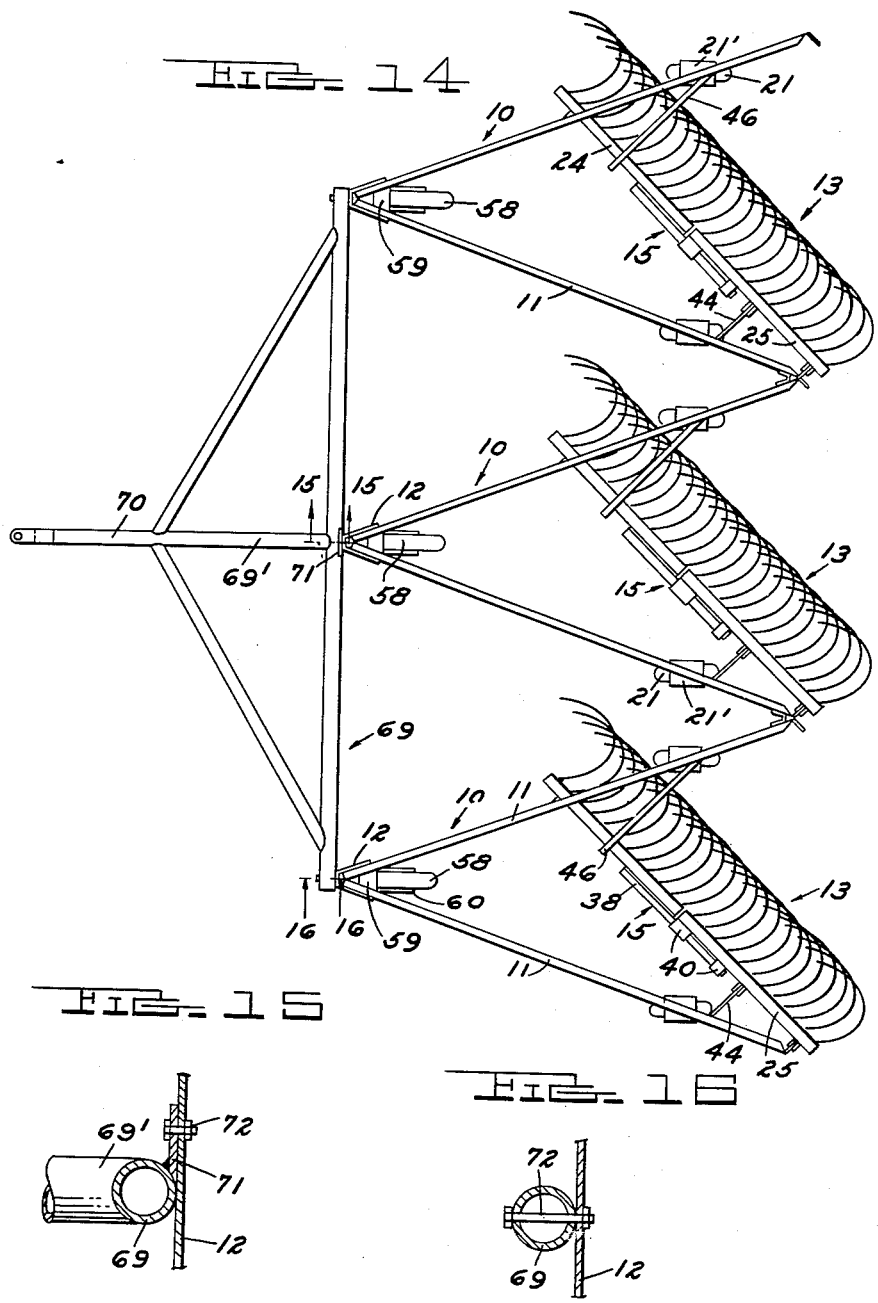
INVENTOR.
ARTHUR RAYMOND CUNNINGHAM
BY Whittemore, Hulbert &
Belknap
ATTORNEYS

United States Patent Office 2,952,963
Patented Sept. 20, 1960

2,952,963

SIDE DELIVERY HAY RAKE

Arthur Raymond Cunningham, Chicago, Ill., assignor to Cunningham & Sons, Chicago, Ill., a partnership Filed Nov. 29, 1957, Ser. No. 699,671

16 Claims. (Cl. 56—376)

The present invention deals with improvements in a side delivery hay rake, being especially suited to the raking of hay or other grain and like field products to form windrows. More particularly, the improvements relate to a multi-tined rake, having a plurality of like arcuate tines of spring steel arranged in a transversely extending set, in particular at an acute angle to the direction of travel of the rake in use. These tines are adapted to pick up the grain from a swath and progressively roll and tumble it along the length of the set of transversely spaced tines, ultimately depositing it in a windrow at the trailing side of the unit.

It is an object of the invention to provide a grain rake of the above character, in which the tines are uniformly curved and disposed in uniform spacing along the length of a supporting bar, itself angled relative to the raking path, as stated, with the tines arranged in parallel planes at an acute angle to the vertical and the contours of the tines overlapping horizontally.

Thus, hay picked up by any tine of the advancing set is caused to slide up the surface of that tine and then, by reason of the angular tine disposition, tumble down upon a tine or tines to the adjacent trailing side thereof. This action is repeated along the tines, causing the grain to be rolled lengthwise along and toward the outside and rear of the inclined tine set, at which the grain is deposited in a windrow.

Another object is to provide a rake of the above description in which the supporting bar upon which the set of tines is carried is pivotally adjustable upon a well-braced draft frame, in a manner to enable the tines to be swung vertically to an inoperative position for road travel of the rake rig or when raking is not being performed.

More specifically, and because of the inclined mounting of the tines of the unit, the tines are disposed in aligned sets and the supporting bar is comprised of two bar sections each mounting a tine set, whereby the respective bar sections and tine sets may be swung oppositely for the intended purpose, without interference with the draft frame.

A further object is to provide a rake as described which is of great adaptability and versatility, provision being made to alter or reverse the angular disposition of the tine supporting bar on the draft frame, in order to make it possible to deposit the formed windrow at either side of the rake, or in any desired relation to a plurality of the tine units assembled in a ganged or tandem rig. The tine units have been specially devised to make possible many different types of ganging.

Coupled with the provisions to attain the object just mentioned, the invention incorporates improvements, of a relatively simple but effective sort, for individually clamping the tines on the supporting bar, permitting the reversing of the position of the tines on the bar when the bar itself is changed as to angularity. This operation is easily performed in a few minutes due to the improved clamp means.

A still further object is to provide a rake having tines supported as described in subdivided groups at either side or end of the rake, each group being mounted on a supporting bar section and the sections being aligned and pivotally swivelled, one on the other, as well as being pivotally carried at the opposite ends thereof on the draft frame. Thus, the bar sections and mounted tine groups are swingable in opposite vertical directions relative to one another, upwardly and downwardly, respectively, in order to bring the same to and from an inoperative, road travel position. The group of tines which is swung downwardly and forwardly to its inoperative position does so without interference with the frame and other supporting provisions located above it, which it laterally underlaps due to the laterally outward inclination of its tines.

Yet another object is to provide adjustable tine mounting means, as described, along with simple and effective linkage means for swingably operating the tines and locking the same in their respective operative and inoperative positions.

A further object is to provide a rake in which curved, angularly arranged tines, inclined in a common angular relation to the vertical and overlapping one another along the length of a supporting bar by which they are carried, may be employed in ganged or tandem sets of two or more for an increased width or range of raking action, provision being made for coupling such sets, individually identical in character, in a simple and expeditious fashion. Thus, due to the provisions for reversing the angularity of the respective tine units, the raking rig may be assembled to rake and roll two swaths into a single center windrow, to rake and roll swaths in opposite directions away from one another and deposit them into relatively widely spaced windrows, or to rake and roll several swaths into individual less widely spaced windrows.

Other objects and features of the invention will become apparent as the description proceeds, especially when taken in conjunction with the accompanying drawings, illustrating preferred embodiments of the invention, wherein:

Fig. 1 is a top plan view of the improved rake of the invention, partially broken away and indicating fragmentarily and in solid and dotted line the optional reversed mountings of the tine units of the rake;

Fig. 2 is a fragmentary rear elevation of the rake, as from the line 2—2 of Fig. 1;

Fig. 3 is a fragmentary view in vertical section along line 3—3 of Fig. 1.

Fig. 4 is a sectional view along line 4—4 of Fig. 1.

Fig. 5 is a sectional view along line 5—5 of Fig. 1.

Fig. 6 is a sectional view along line 6—6 of Fig. 1.

Fig. 7 is a fragmentary top plan view in enlarged scale showing the means to mount individual tines on the supporting bar therefor, with provision for easily and quickly switching the angular disposition of the tine when desired;

Fig. 8 is a view in vertical section along the line 8—8 in Fig. 7;

Fig. 9 is a fragmentary view in vertical section on line 9—9 of Fig. 8.

Fig. 10 is a perspective view of an improved tine mounting block or clamp for the purpose;

Fig. 11 is a top plan view of a ganged arrangement of tine units, constructed according to Figs. 1 through 10, on a common yoke and draft frame;

Fig. 12 is a fragmentary end elevation, in enlarged scale, showing a ground wheel or caster mount for such a ganged arrangement;

Fig. 13 is a fragmentary elevation of the forward, draft vehicle end of a draft frame equipped with suggested drawbar coupling provision;

Fig. 14 is a top plan view of a different type of ganged rake arrangement, shown as employing three rake tine units of the sort depicted in Figs. 1 and 2; and Fig. 15 is a fragmentary enlarged view in vertical section along the line 15—15 of Fig. 14.

Fig. 16 is a sectional view along line 16—16 of Fig. 14.

Referring first to Figs. 1 and 2 of the drawings, the reference numeral 10 generally designates a draft frame for the rake of the invention, which frame is appropriately attached to the draft member of whatever type vehicle is to pull the rake. It is shown as being of rugged channel construction, being constituted by a pair of elongated side channel members or pieces 11 and 11', disposed in the form of a V. These channels are united at the forwardly disposed apex of the V-form by suitable provisions such as a rugged V-shaped bracket 12 bolted at 64 along the sides and front of the apex. This bracket affords a means for coupling the device to a draft vehicle, or to a yoke in a gang installation, as later described.

The reference numeral 13 generally designates a rake tine unit in accordance with the invention. This unit comprises a relatively large number of tines 14 (in excess of twenty in the illustrated embodiment, though the number may vary), which are adjustably carried by a supporting bar unit 15 in a manner hereinafter described.

The tines 14 are of a like curved, approximately semicircular outline and are fabricated of spring steel. They are arranged along the length of the supporting bar 15 in equal longitudinally spaced succession, their planes are in a parallel uniformly inclined disposition of about 45° to the vertical (Fig. 2), and are in closely overlapped relation, horizontally, of their curved tine contours, as seen in Figs. 1 and 2. The degree of overlap is such that a major portion of the area within the vertically projected outline of any given tine overlaps that of a tine on one side thereof.

The supporting bar 15 is itself inclined in a forward to rear direction at an acute angle to the path of advance of the rake, i.e., to a line bisecting the angle between the side channel members 11 and 11'. Thus, it is seen that a cluster or sheaf of grain encountered, for example, by the forwardmost end of the inclined tine unit 13, i.e., by one or more of the tines 14 at the upper portion of Fig. 1 (or the righthand end of Fig. 2), will be caused upon advance of the tine unit to ride or slide up the inclined length of the tine, then upon reaching a certain elevation to topple downwardly and be picked up by the next inner tine or tines toward the bottom of Fig. 1 (or the left of Fig. 2). The action continues to repeat, rolling the grain along the length of the tine unit. Naturally, the mass of grain increases as the swath material reaches the endmost tine at the trailing windrow-discharge side of the rake, i.e., at the bottom of Fig. 1 and the lefthand extremity of Fig. 2.

Thus, a highly effective windrowing action is accomplished with a minimum drag on the draft vehicle for the rig, due to the sliding tumbling and rolling effect; and the windrow is deposited in good condition for subsequent pickup or stacking.

Fig. 1 of the drawings depicts in solid line an angular arrangement of the tine unit for raking, rolling and discharging the windrow in the fashion described above. It also indicates, in dotted line, an optional altered or reversed disposition of the supporting bar 15 and tine unit 13, which will deposit the windrow in the opposite direction. Such an arrangement requires a reversal of angularity of the individual tines which is effected by recourse to the improved tine mounting means hereinafter described.

In order to permit angular switching of the bar 15 and tines as a unit, each of the frame side members 11 and 11' is provided at its trailing end with a bracket 17 of rigid strap iron, which is welded or otherwise rigidly secured to the vertical web of the frame side member. This bracket presents a terminal, inwardly angled ear 18 which is apertured at 18' for the reception of a mounting and pivoting bolt, pin or stud 19. Adjacent its opposite ends, the supporting bar member 15 is provided with a pair of fork-like, forwardly projecting, apertured ears 20 for straddling engagement with the ear 18 of the bracket 17, as best indicated adjacent the lower righthand end of Fig. 1.

Suitably treaded ground and road wheels 21 are appropriately mounted beneath the frame 10, preferably by forked journal plates 21' welded in depending relation to the frame channels just forwardly of their rear brackets 17.

Each of the draft frame side members 11 and 11' also carries, medially of the length thereof, a depending apertured pivoting ear 22, which is also adapted for straddling engagement by the forked end ears 20 of the bar 15. Fig. 1 indicates in solid and dotted lines, respectively, the mode of adjustment between optional angular positions of the bar and tine unit, in which the bar is disposed at acute angles to and on either side of a theoretical line extending forwardly from the bar 15 in the direction of translation of the frame 10 in raking. The change-over is easily and quickly effected to adapt the structure for raking in different directions with a single unit, for example, as is desirable in the coverage of marginal zones of a field otherwise inaccessible for a rake of this type. The switch-over arrangement also has decided utility in a ganged or tandem arrangement of plural rake units, as hereinafter described.

Figs. 7—10, considered in conjunction with Figs. 1 and 2, illustrate improved structural features for the individual reversal of angularity of the tines 14, as is entailed in a switch of angularity of the bar and tine unit as a whole. Considering the tine supporting bar 15 to be constituted, for a purpose to be further described, by a pair of aligned bar sections 24, 25, each of rigid angle iron construction, these sections each have rigidly secured to the horizontally and rearwardly extending flange 26 thereof special tine mounting blocks 27, which may be in the form of a casting, best shown in Figs. 9 and 10.

The block 27 has an angled nose defined by vertical sides 28 disposed at an obtuse angle to the adjacent sides of the block and intersecting one another at a right angle. This permits the block 27 to be positioned with either of the sides 28 in flush engagement with the forward vertical flange, designated 29, of a bar section 24 or 25; and in this position the block is tightly snugged up against the horizontal flange 26 by a bolt 30 applied through a central vertical aperture 31 in the body of the block 27, and through a mating aperture in the bar flange 26.

Tine clamp block 27 is formed to provide a horizontal groove 32 of arcuate cross section extending from side to side across its upper surface, and downwardly inclined grooves 33 extend from the base of the groove 32 rearwardly and downwardly through the bottom surface of the block. As shown in Fig. 9, each of the tines 14 is formed to provide a cushioning spring loop 34 adjacent its mounting end and, forwardly of that loop, a right angled extension 35.

With the tine 14 clamped by the block in one of the optional positions, the tine itself, forwardly of the loop 34, is cradled in the groove 32, and its terminal extension 35 is disposed in and similarly cradled by one of the inclined grooves 33. With the tine thus arranged the block 27 is clamped upwardly against a bar section 24 or 25 to properly present and rigidly hold the tine in its operative position. In order to reverse the individual angularity of the tines, the blocks are simply removed, the tine extension 35 changed to the other groove 33, and the block 27 re-clamped to the supporting bar section. The arrangement is an exceedingly simple one and insures a uniform parallel disposition of the tines, with their contours properly parallelled and overlapped.

As indicated above, the invention makes provision for the swinging of the sets of tines 14 to inoperative position. As appears from Fig. 1, one of these sets may be swung upwardly to such a position, depicted in Fig. 3, since it will clear the draft frame at its end, i.e., at the lower and righthand and appearing in Fig. 1. This is the set of tines carried by the supporting bar section 25. However, the other set supported by the other bar member or section 24, cannot be swung upwardly for adjustment, inasmuch as it underlies the draft frame 10 adjacent its end. See Figs. 1 and 2.

Therefore, in order to permit a swing of the bar sections 24, 25 in opposite vertical directions relative to one another, about their respective pivots to the extension ears 18 of the frame side channels 11 and 11', the bar member 24 is equipped with tubular hinge member 38 (Figs. 1 and 6). Member 38 is welded at 38' to the vertical bar flange 29, with a spacer strip 39 interposed, and extends beyond the inner end of the bar member 24. The other bar member 25 has a pair of longitudinally spaced, tubular hinge sleeves 40 welded to its vertical flange 29 in aligned relation with the tubular pivot member 38; and these sleeves are telescoped over the projecting end of that member, thus affording a pivot of the inner end of member 25 on the adjacent end of member 24. A pair of removable radial pins 41 extend through the hinge member 38 between and immediately adjacent the hinge sleeves 40, thus restraining axial movement of the bar members or sections relative to one another.

Figs. 3 and 4 show improved means for swingably actuating the supporting sections 24, 25 to and from inoperative position, i.e., upwards and counterclockwise in the case of the member 25 and downward and clockwise in the case of the member 24. The two arrangements are similar, hence corresponding parts will be designated by corresponding reference numerals.

As shown in Fig. 3, the frame channel 11 on which the supporting member 25 is pivoted has a bracket plate 43 bolted thereto at an angle between its flanges. This bracket plate has an integral, rearwardly disposed, angled extension 44 affording a pivot for the adjusting parts to be described. The other bar member 24 (Fig. 4) has bolted thereon a 90° rearwardly extending bracing channel 46, and a bracket plate 47 is bolted on the channel 46 forwardly of the bar member 24 to afford a pivot for the adjusting means to be described. The bracing channel 46 is appropriately secured at its rear end to the adjacent frame channel 11, as by bolting an angled strap extension 46' on the member 46 to the channel 11, to assist in the stabilization of the two parts.

Each of the supporting bar members 24, 25 has an upwardly extending operating arm 48 bolted to its upper flange 26. In the case of the bar member 24 the arm 48 is angled forwardly (Fig. 4), whereas on arm 48 for the other bar member 25 (Fig. 3), the inclination is to the rear. Each of the bracket plates 44, 47 has an L-shaped operating lever 49 pivoted thereon by a pin 50 or the like at the end of the shorter arm of the lever 49. The longer end of the lever has elongated slots 51, 52, formed therein, and the outer end of the arm 48 is articulated to lever 49 by a bolt 53 adapted to be inserted in either of the slots 51, 52 and then taken up to lock the adjusting parts in position, i.e., in the operative raking posing shown in solid lines in Figs. 3 and 4, or the inoperative withdrawn road travel position shown in dotted line in these figures.

The operation of the adjusting arrangements just described is believed clear from Figs. 3 and 4. The tines 14 on the respective bar members 24, 25, are clamped in their desired operative position, in respect to the angularity of the bar unit 15, with the bolt 53 received and clamped in the slot 51 in the case of the bar member 24 and in the slot 52 in the case of the bar member 25. When adjustment of the tines is desired, the bolt is loosened and the operating lever manipulated by swinging the same, counterclockwise in Fig. 3 and clockwise in Fig. 4, to bring the parts to the dotted line position. In such position, the bolt 53 is removed, reinserted in the other slot, 51 or 52 as the case may be, and taken up to lock the tine units 13 in the operative position.

It is evident that when the angularity of the bar unit 15 and tine unit 13 is changed, as described above, the connections of the adjustment bracket 44, channel 46, mounting arms 48 and levers 49 will be switched in relation to the frame side channels 11 to permit the necessary frame clearance.

Fig. 11 of the drawings shows a rig incorporating two of the tine units 13, each mounted on a supporting bar unit 15 of the character described in connection with Figs. 1 through 10, and it is seen that the arrangement of these respective units relative to their respective draft frame structures 10 is the same as has been previously described, although the frame connections are reversed in angularity so that the tine units 13 converge rearwardly. The trailing ends of the frames are appropriately connected to one another releasably, as by an angled coupling element 55.

The rig of Fig. 11 permits two adjacent swaths to be raked and rolled into a single central windrow along which the swaths are deposited at the apex of the respective angularly disposed tine units 13. In the event the hay or other grain is heavy, one or more inner tines may be removed from either or both units for clearance.

The forward ends of the draft frames 10 are suitably connected to a transverse coupling yoke 56 of tubular section having a braced draw bar 57 for connection to the draft vehicle. In the case of a coupled rig of this type, the draft frames 10 are preferably equipped with swivelled ground or road casters 58 adjacent their respective connections to the yoke 56. For this purpose, a swivel bracket 59 is secured by bolts 60 to the bottom of the apex of the respective draft frames 10, as well as to the flanges of the brackets 12, and forks or legs 61 on which the casters 58 are journaled are appropriately swivelled to the brackets 59 at 62 for pivoting in a horizontal plane.

In any of the multiple or ganged forms shown, the draft frame 10 may carry appropriate means to swivel it to the ends of a draw bar, a drag link, a yoke or like tow member. To this end, as shown in Fig. 13, the forward U-shaped apex bracket 12, as secured by bolts 64 to the draft frame channels 11 and 11', may have a forked coupling yoke 65 swivelled thereon on a horizontal axis to make the draft connection to the draft member in question.

A treble coupled rig is illustrated in Fig. 14 of the drawings, which is capable of raking and rolling three separate parallel windrows. Inasmuch as the component parts are in the main identical to those previously described, further description is dispensed with and corresponding reference numerals are applied to corresponding parts.

Sectional Figs. 15 and 16 show provisions for mounting the forward ends of the three draft frames 10 to a transverse tubular coupling yoke bar 69, generally similar to the yoke 56, equipped with a braced draft member 70. The yoke bar 69 has an upright adapter plate 71 welded thereto at its center for securement by a bolt 72 to the mounting bracket 12 of the center rake unit. This permits access in applying the center unit, in view of the presence of the tubular yoke brace 69' in this zone. The other end connections are made by bolts 72 removably securing the brackets 12 to the yoke (Fig. 16).

It may be desired to operate the treble rig of Fig. 14 without a center caster wheel 58. If so, the latter is removed by simply removing the bolt or bolts 60 securing it to the swivel bracket 59. The bracket 59 may be similarly removed, enabling one of these units to service different styles of rig.

It is seen from the above that the invention affords a side delivery hay rake operating on the principle of picking up and rolling the grain longitudinally of an inclined set of individually inclined, curved tines, discharging to either desired side of the tines, whether in a single tine unit, per Figs. 1 and 2, or the multiple ganged arrangements of Figs. 11 and 14. The grain is handled expeditiously and in large capacity, with a minimum of drag imposed on the draft vehicle; and the deposited windrows are of uniform mass to promote subsequent ready pickup or stacking. The component parts are light in weight, though the rake is a very rugged and well braced one, and the construction is, over all, a very inexpensive one, indeed.

What I claim as my invention is:

1. In a rake rig adapted to be moved in a given direction in raking, a pair of longitudinally aligned sets of rake tines disposed at an acute angle to the direction of raking movement of the rig, a supporting frame, and a bar structure comprising independently mounted bar sections mounting said sets on said frame for vertical swinging adjustment in opposite directions relative to one another to and from operative raking positions, and means supported on said frame and operatively connected to said respective bar sections to swing the same in said opposite directions.

2. In a rake rig adapted to be moved in a given direction in raking, a pair of longitudinally aligned sets of rake tines disposed at an acute angle to the direction of raking movement of the rig, a supporting frame, and a bar structure mounting said sets on said frame for vertical swinging adjustment in opposite directions relative to one another to and from operative raking positions, comprising a pair of longitudinally aligned bar sections pivoted on said frame at the respective opposite, outer ends thereof, means pivotally connecting said sections to one another at the adjacent, inner ends thereof, and means supported on said frame and operatively connected to said respective bar sections to swing the same in said opposite directions.

3. In a rake rig adapted to be moved in a given direction in raking, a pair of longitudinally aligned sets of rake tines disposed at an acute angle to the direction of raking movement of the rig, a supporting frame, and a bar structure mounting said sets on said frame for vertical swinging adjustment in opposite directions relative to one another to and from operative raking position, comprising a pair of longitudinally aligned bar sections pivoted on said frame at the respective opposite, outer ends thereof, means including coacting telescoped elements pivotally connecting said sections to one another at the adjacent, inner ends thereof, and means supported on said frame and operatively connected to said respective bar sections to swing the same in said opposite directions.

4. In a rake rig adapted to be moved in a given direction in raking, a pair of longitudinally aligned sets of rake tines disposed at an acute angle to the direction of raking movement of rig, a supporting frame, and a bar structure mounting said sets on said frame for vertical swinging adjustment in opposite directions relative to one another to and from operative raking position, comprising a pair of longitudinally aligned bar sections pivoted on said frame at the respective opposite, outer ends thereof, means pivotally connecting said sections to one another at the adjacent, inner ends thereof, and linkage means supported on said frame and operatively connected to said respective bar sections to swing the same in said opposite directions, said linkage means comprising an arm fixed on one of said sections, a lever pivoted on said bar structure and means releasably connecting said lever to said arm to impart swinging thrust thereto upon pivoting of said lever.

5. A rake adapted to be moved in a given direction in raking comprising a plurality of individually adjustable rake tine units each comprised of a set of curved, longitudinally spaced tines of flat curved contour arranged in horizontally overlapping relation and in planes parallel and inclined to the vertical, and means mounting said tine units at an acute angle to the direction of raking movement of the rake, said respective tine sets being subdivided into groups which are pivoted on said mounting means for independent vertical swinging adjustment of the respective groups in opposite directions relative to one another in shifting the same respectively to and from operative raking position.

6. A rake in accordance with claim 5, in which a pair of said tine units are disposed by said mounting means to converge toward the trailing end of the rake.

7. A rake in accordance with claim 5, in which a pair of said tine units are disposed by said mounting means to converge in a V-shaped outline toward the trailing end of the rake.

8. A rake in accordance with claim 5, in which said tine units are disposed by said mounting means in generally parallel, transversely offset relation to one another.

9. A rake comprising a movable frame adapted to be moved in a predetermined direction in raking, a series of longitudinally spaced arcuate tines of unitary wire rod stock of uniform cross section throughout the length thereof arranged with their arcuate outlines substantially overlapping horizontally and in planes at an acute angle to the vertical, and means mounting one end of each tine of said series of tines on said movable frame, with the tines disposed at an acute angle to the direction of movement thereof in raking, a major portion of the vertically projected area within a tine outline overlapping horizontally that of a tine next thereto.

10. A rake comprising a movable frame adapted to be moved in a predetermined direction in raking, a series of longitudinally spaced, like arcuate tines of unitary wire rod stock of uniform cross section throughout the length thereof arranged with their arcuate outlines substantially overlapped horizontally and parallel and at an acute angle to the vertical, and means mounting one end of each tine of said series of tines on said movable frame, with the tines disposed at an acute angle to the direction of movement thereof in raking, a major portion of the vertically projected area within a tine outline overlapping horizontally that of a tine next thereto, said tines being mounted in sets and said means including a supporting bar structure having provisions to swing said sets in opposite vertical directions to and from operative raking position.

11. A rake comprising a movable supporting frame of V-shaped outline having divergent legs and adapted to be translated in the direction of its apex in raking, a tine unit including a series of spaced, similarly curved tines, a supporting bar on which said tines are mounted, and means to mount said bar on the divergent legs of said V-shaped frame at optional acute angles to and on either side of a theoretical line extending from said bar in the direction of translation of said frame in raking, comprising at least two means spaced longitudinally along each leg for the optional attachment of the ends of said bar to said respective legs at said respective angles.

12. A rake comprising a movable supporting frame of V-shaped outline having divergent legs and adapted to be translated in the direction of its apex in raking, a tine unit including sets of spaced, similarly curved tines, a supporting bar on which said tines are mounted, and means to mount said bar on the divergent legs of said V-shaped frame at optional acute angles to and on either side of a theoretical line extending from said bar in the direction of translation of said frame in raking, comprising at least two means spaced longitudinally along each leg for the optional attachment of the ends of said bar to said respective legs at said respective angles, said mounting means further including means to swing said respective tine sets in different directions vertically relative to one another to dispose the same in and out of operative raking position.

13. A rake adapted to be moved in a predetermined direction in raking, comprising a plurality of rake tine units each comprised of a set of curved longitudinally spaced tines of unitary wire rod stock of uniform cross section throughout the length thereof arranged in horizontally overlapped relation and in planes parallel and inclined to the vertical, and means mounting one end of each tine of each of said tine units, with said tines at an acute angle to the direction of raking movement of the rake, a major portion of the vertically projected area within each tine contour overlapping horizontally that of a tine next thereto.

14. A rake in accordance with claim 13, in which a pair of said tine units are disposed by said mounting means to converge toward the trailing end of the rake.

15. A rake in accordance with claim 13, in which a pair of said tine units are disposed by said mounting means to converge in a V-shaped outline toward the trailing end of the rake.

16. A rake in accordance with claim 13, in which said tine units are disposed by said mounting means in generally parallel, transversely offset relation to one another.

References Cited in the file of this patent
UNITED STATES PATENTS

| | | |
|---|---|---|
| 39,989 | Carpenter | Sept. 15, 1863 |
| 406,363 | Mann et al. | July 2, 1889 |
| 463,461 | Soehren | Nov. 17, 1891 |
| 743,720 | Henning | Nov. 10, 1903 |
| 773,208 | Ketelsen | Oct. 25, 1904 |
| 1,061,649 | Wick | May 13, 1913 |
| 1,109,897 | Bistline et al. | Sept. 8, 1914 |
| 1,325,580 | Reiter | Dec. 23, 1919 |
| 1,537,618 | Proper | May 12, 1925 |
| 2,179,583 | Wilson | Nov. 14, 1939 |
| 2,376,547 | Lyle | May 22, 1945 |
| 2,667,730 | McCall et al. | Feb. 2, 1954 |
| 2,735,256 | West | Feb. 21, 1956 |
| 2,744,377 | McCall et al. | May 8, 1956 |